(12) United States Patent  (10) Patent No.: US 8,346,522 B2
Shan et al.  (45) Date of Patent: *Jan. 1, 2013

(54) COMPUTER SIMULATION OF PHYSICAL PROCESSES

(75) Inventors: Xiaowen Shan, Burlington, MA (US); Hudong Chen, Newton, MA (US); Raoyang Zhang, Burlington, MA (US)

(73) Assignee: Exa Corporation, Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/526,020

(22) Filed: Jun. 18, 2012

(65) Prior Publication Data

US 2012/0265511 A1  Oct. 18, 2012

Related U.S. Application Data

(63) Continuation of application No. 12/494,921, filed on Jun. 30, 2009, now Pat. No. 8,224,633, which is a continuation of application No. 11/463,673, filed on Aug. 10, 2006, now Pat. No. 7,558,714.

(51) Int. Cl.
G06G 7/48  (2006.01)
(52) U.S. Cl. .................................. 703/9; 703/2
(58) Field of Classification Search .................... 703/2, 9
See application file for complete search history.

(56) References Cited

U.S. PATENT DOCUMENTS

| | | | |
|---|---|---|---|
| 5,594,671 A | 1/1997 | Chen et al. |
| 5,606,517 A | 2/1997 | Traub et al. |
| 5,848,260 A | 12/1998 | Chen et al. |
| 5,910,902 A | 6/1999 | Molvig et al. |
| 5,953,239 A | 9/1999 | Teixeira et al. |
| 6,089,744 A | 7/2000 | Chen et al. |
| 6,228,664 B1 | 5/2001 | Bronson et al. |

OTHER PUBLICATIONS

International Preliminary Report on Patentability in PCT/US2007/073868, mailed Feb. 19, 2009, 6 pages.
European Search Report issued on Jul. 10, 2009 in EP 07813097.8, 5 pages.
Gad-el-Hak, M. Liquids: The Holy Grail of Microfluidics Modeling, 2004 International Conference on MEMS, NANO and Smart Systems, 2004, pp. 332-337.
H. Chen et al., "Recovery of Full Rotational Invariance in Lattice Boltzmann Formulations for High Knudsen Number Flows," Physica A, North-Holland, Amsterdam, NL, vol. 362, No. 1, Mar. 15, 2006, pp. 125-131.

(Continued)

*Primary Examiner* — Russell Frejd
(74) *Attorney, Agent, or Firm* — Fish & Richardson P.C.

(57) ABSTRACT

Simulating a physical process includes storing, in a computer-accessible memory, state vectors for voxels, where the state vectors correspond to a model and include entries that correspond to particular momentum states of possible momentum states at a voxel. Interaction operations are performed on the state vectors. The interaction operations model interactions between elements of different momentum states according to the model. Move operations performed on the state vectors reflect movement of elements to new voxels according to the model. The model is adapted to simulate a high-Knudsen number flow that has a Knudsen number greater than 0.1.

40 Claims, 8 Drawing Sheets

OTHER PUBLICATIONS

International Search Report and Written Opinion of the International Searching Authority issued on Jul. 15, 2008, in co-pending PCT Application No. PCT/US07/73868.

Raoyang Zhang et al., "Efficient Kinetic Method for Fluid Simulation Beyond the Navier-Stokes Equation," arXiv:Physics/0604191V1 [physics.com-ph] [Online], Apr. 24, 2006, pp. 1-6, http://de.arxiv.org/PS_cache/physics/pdf/0604/0604191v1.pdf>.

Xiawen Shan et al., "Kinetic Theory Representation of Hydrodynamics: A Way Beyond the Navier-Stokes Equation," Journal of Fluid Mechanics, Cambridge University Press, UK, vol. 550, Mar. 10, 2006, pp. 413-441.

Y. Zhou et al., "Simulation of Micro- and Nano-Scale Flows Via the Lattice Botlzmann Method," Physica A, North-Holland, Amsterdam, NL. vol. 362, No. 1, Mar. 15, 2006, pp. 68-77.

COMPUTER SIMULATION OF PHYSICAL PROCESSES

CROSS REFERENCE TO RELATED APPLICATION

This application is a continuation of U.S. application Ser. No. 12/494,921, filed Jun. 30, 2009, titled COMPUTER SIMULATION OF PHYSICAL PROCESSES, now U.S. Pat. No. 8,224,633, which is a continuation of U.S. application Ser. No. 11/463,673, filed Aug. 10, 2006, titled COMPUTER SIMULATION OF PHYSICAL PROCESSES, now U.S. Pat. No. 7,558,714, which are incorporated herein by reference in their entirety.

TECHNICAL FIELD

This description relates to computer simulation of physical processes, such as fluid flow.

BACKGROUND

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

In an improved lattice gas technique, the state vector at each lattice site includes many more bits (e.g., 54 bits for subsonic flow) to provide variation in particle energy and movement direction, and collision rules involving subsets of the full state vector are employed. In a further improved system, more than a single particle was permitted to exist in each momentum state at each lattice site, or voxel (these two terms are used interchangeably throughout this document). For example, in an eight-bit implementation, 0-255 particles could be moving in a particular direction at a particular voxel. The state vector, instead of being a set of bits, was a set of integers (e.g., a set of eight-bit bytes providing integers in the range of 0 to 255), each of which represented the number of particles in a given state.

More recently, Lattice Boltzmann Methods (LBM) use a mesoscopic representation of a fluid to simulate 3D unsteady compressible turbulent flow processes in complex geometries at a deeper level than possible with conventional computational fluid dynamics ("CFD") approaches. A brief overview of a LBM method is provided below.

Boltzmann-Level Mesoscopic Representation

It is well known in statistical physics that fluid systems can be represented by kinetic equations on the so-called "mesoscopic" level. On this level, the detailed motion of individual particles need not be determined Instead, properties of a fluid are represented by the particle distribution functions defined using a single particle phase space, $f=f(x, v, t)$, where x is the spatial coordinate while v is the particle velocity coordinate. The typical hydrodynamic quantities, such as mass density, fluid velocity and temperature, are simple moments of the particle distribution function. The dynamics of the particle distribution functions obeys a Boltzmann equation:

$$\partial_t f + v \nabla_x f + F(x,t) \nabla_v f = C\{f\}, \qquad \text{Eq. (1)}$$

where F(x,t) represents an external or self-consistently generated body-force at (x,t). The collision term C represents interactions of particles of various velocities and locations. It is important to stress that, without specifying a particular form for the collision term C, the above Boltzmann equation is applicable to all fluid systems, and not just to the well known situation of rarefied gases (as originally constructed by Boltzmann).

Generally speaking, C includes a complicated multi-dimensional integral of two-point correlation functions. For the purpose of forming a closed system with distribution functions $f$ alone as well as for efficient computational purposes, one of the most convenient and physically consistent forms is the well-known BGK operator. The BGK operator is constructed according to the physical argument that, no matter what the details of the collisions, the distribution function approaches a well-defined local equilibrium given by $\{f^{eq}(x, v, t)\}$ via collisions:

$$C = -\frac{1}{\tau}(f - f^{eq}), \qquad \text{Eq. (2)}$$

where the parameter $\tau$ represents a characteristic relaxation time to equilibrium via collisions. Dealing with particles (e.g., atoms or molecules) the relaxation time is typically taken as a constant. In a "hybrid" (hydro-kinetic) representation, this relaxation time is a function of hydrodynamic variables like rate of strain, turbulent kinetic energy and others. Thus, a turbulent flow may be represented as a gas of turbulence particles ("eddies") with the locally determined characteristic properties.

Numerical solution of the Boltzmann-BGK equation has several computational advantages over the solution of the Navier-Stokes equations. First, it may be immediately recognized that there are no complicated nonlinear terms or higher order spatial derivatives in the equation, and thus there is little issue concerning advection instability. At this level of description, the equation is local since there is no need to deal with pressure, which offers considerable advantages for algorithm parallelization. Another desirable feature of the linear advection operator, together with the fact that there is no diffusive operator with second order spatial derivatives, is its ease in realizing physical boundary conditions such as no-slip surface or slip-surface in a way that mimics how particles truly interact with solid surfaces in reality, rather than mathematical conditions for fluid partial differential equations ("PDEs"). One of the direct benefits is that there is no problem handling the movement of the interface on a solid surface, which helps to enable lattice-Boltzmann based simulation software to successfully simulate complex turbulent aerodynamics. In addition, certain physical properties from the boundary, such as finite roughness surfaces, can also be incorporated in the force. Furthermore, the BGK collision operator is purely local, while the calculation of the self-consistent body-force can be accomplished via near-neighbor information only. Consequently, computation of the Boltzmann-BGK equation can be effectively adapted for parallel processing.

Lattice Boltzmann Formulation

Solving the continuum Boltzmann equation represents a significant challenge in that it entails numerical evaluation of an integral-differential equation in position and velocity phase space. A great simplification took place when it was observed that not only the positions but the velocity phase space could be discretized, which resulted in an efficient numerical algorithm for solution of the Boltzmann equation. The hydrodynamic quantities can be written in terms of simple sums that at most depend on nearest neighbor information. Even though historically the formulation of the lattice Boltzmann equation was based on lattice gas models prescribing an evolution of particles on a discrete set of velocities $v(\epsilon\{c_i, i=1, \ldots, b\})$, this equation can be systematically derived from the first principles as a discretization of the continuum Boltzmann equation. As a result, LBE does not suffer from the well-known problems associated with the lattice gas approach. Therefore, instead of dealing with the continuum distribution function in phase space, $f(x, v, t)$, it is only necessary to track a finite set of discrete distributions, $f_i(x,t)$ with the subscript labeling the discrete velocity indices. The key advantage of dealing with this kinetic equation instead of a macroscopic description is that the increased phase space of the system is offset by the locality of the problem. Due to symmetry considerations, the set of velocity values are selected in such a way that they form certain lattice structures when spanned in the configuration space. The dynamics of such discrete systems obeys the LBE having the form $f_i(x+c_i,t+1)-f_i(x,t)=C_i(x,t)$, where the collision operator usually takes the BGK form as described above. By proper choices of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined as:

$$\rho(x, t) = \sum_i f_i(x, t); \rho u(x, t) = \sum_i c_i f_i(x, t); \qquad \text{Eq. (3)}$$

$$DT(x, t) = \sum_i (c_i - u)^2 f_i(x, t),$$

where $\rho$, $u$, and T are, respectively, the fluid density, velocity and temperature, and D is the dimension of the discretized velocity space (not at all equal to the physical space dimension).

DESCRIPTION

A. Model Simulation Space

Figure 1:
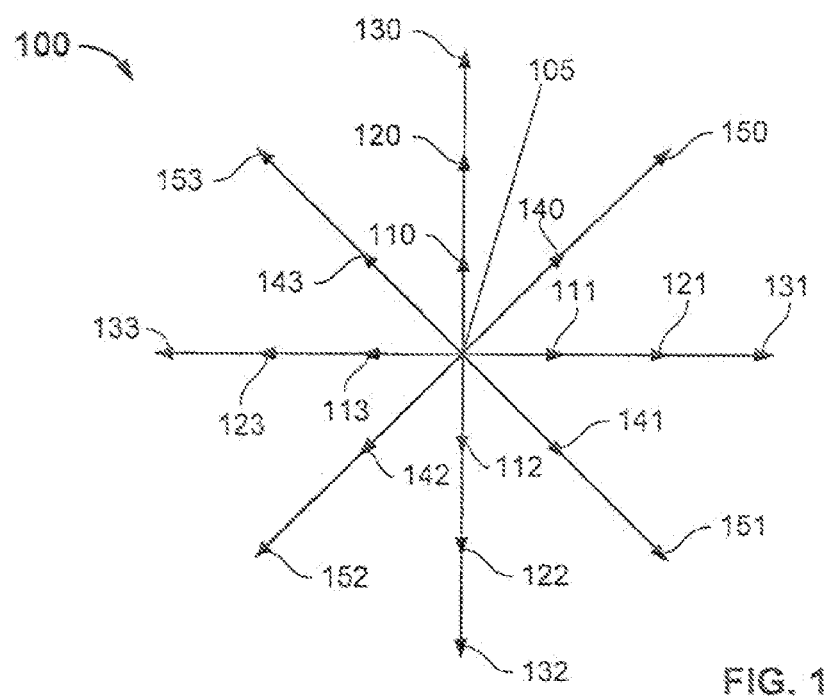
FIGS. 1 and 2 illustrate velocity components of two LBM models.

A physical process simulation system uses an improved lattice Boltzmann method ("LBM") model that permits the system to accurately and effectively simulate high-Knudsen number flows. High-Knudsen number flows are flows where the ratio between the molecular mean free path (i.e., the distance a particle is expected to move without colliding with another particle) and the characteristic length scale (i.e., the voxel size) is high. High-Kundsen number flows may occur in very low density gases, such as are found at very high altitudes or in fluids flowing around surfaces having very small spatial scales, such as are found in micro-devices.

In an LBM-based simulation, fluid flow may be represented by the distribution function values $f_i$, evaluated at a set of discrete velocities $c_i$. The dynamics of the distribution function is governed by Equation 1 where $f_i(0)$ is known as the equilibrium distribution function, defined as: Equation (4)

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \qquad \text{Eq. (4)}$$

The first equation above is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, we calculate the "collision factor", that is, the effect of nearby pockets of fluid on the starting pocket of fluid. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

The second equation is what the distribution function tends to be when the fluid system has reached to the equilibrium state. The form of the equilibrium state in the lattice Boltzmann equation plays a critical role in determining the macroscopic hydrodynamic behavior.

From this simulation, conventional fluid variables, such as mass ρ and fluid velocity u, are obtained as simple summations in Equation (3). Here, the collective values of $c_i$ and $w_i$ define a LBM model.

The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken assuming the Knudsen number is a small quantity. In the order of accuracy, the obtained macroscopic equations are the Euler, Navier-Stokes, Burnett and super-Burnett equations respectively. While the Navier-Stokes level of approximation is deemed sufficient for most of the fluid engineering problems, it is not sufficient for situations where the Knudsen number is not small (e.g., Kn>0.1). The Burnett and super-Burnett levels of approximations are often used in these situations although there are both theoretical and practical difficulties associated with these approximations.

Prior LBM systems had difficulty accurately simulating high-Knudsen number flows because the discrete numerical artifacts introduced by the models employed by those systems become significant at high Knudsen numbers. By employing models such as are described below, these problems may be avoided and LBM simulations that lead to accurate numerical reproduction of flow physics at high Knudsen numbers can be achieved.

Tables 1 and 2, as set forth below, illustrate four representative models (3D-1, 2D-1, 3D-2 and 2D-2) that may be used to simulate high-Knudsen number flows.

TABLE 1

Discrete velocities and weights of the high-Knudsen number kinetic models at the Burnett order. Listed are the number of points in the symmetry group, velocities, $c_i$, and the weights $w_i$. The subscript FS denotes permutations with full symmetry. All velocities are normalized with respect to the sound speed. The magnitude of the unit velocities are $r = \sqrt{3/2}\sqrt{}$

| Model | Number of points | $c_i$ | $w_i$ |
|---|---|---|---|
| 3D-1 | 1 | (0, 0, 0) | 1/12 |
| | 6 | (r, 0, 0)$_{FS}$ | 1/12 |
| | 8 | (±r, ±r, ±r) | 1/27 |
| | 6 | (2r, 0, 0)$_{FS}$ | 2/135 |
| | 12 | (2r, 2r, 0)$_{FS}$ | 1/432 |
| | 6 | (3r, 0, 0)$_{FS}$ | 1/1620 |
| 2D-1 | 1 | (0, 0) | 91/324 |
| | 4 | (r, 0)$_{FS}$ | 1/12 |
| | 4 | (±r, ±r) | 2/27 |
| | 4 | (2r, 0)$_{FS}$ | 7/360 |
| | 4 | (±2r, ±2r) | 1/432 |
| | 4 | (3r, 0)$_{FS}$ | 1/1620 |

TABLE 2

Discrete velocities and weights of the high-Knudsen number kinetic models at the Burnett order. Listed are the number of points in the symmetry group, velocities, $c_i$, and the weights $w_i$. The subscript FS denotes permutations with full symmetry. All velocities are normalized with respect to the sound speed. The magnitude of the unit velocities are r = 1.1969797703930743590.

| Model | Group | Number of points | $c_i$ | $w_i$ |
|---|---|---|---|---|
| 3D-2 | 1 | 1 | (0, 0, 0) | 0.032633351764471159466 |
| | 2 | 6 | (r, 0, 0)$_{FS}$ | 0.097656833590334574221 |
| | 3 | 8 | (±r, ±r, ±r) | 0.028097750290257335627 |
| | 4 | 6 | (2r, 0, 0)$_{FS}$ | 0.001045259560430061466 |
| | 5 | 24 | (2r, r, 0)$_{FS}$ | 0.005705329016894815990 |
| | 6 | 12 | (2r, 2r, 0)$_{FS}$ | 0.000611939269829747839 |
| | 7 | 6 | (3r, 0, 0)$_{FS}$ | 0.000284443251800055207 |
| | 8 | 8 | 2(±r, ±r, ±r) | 0.000155964159374283722 |
| | 9 | 24 | (r, r, 3r)$_{FS}$ | 0.000130698375985191585 |
| | 10 | 8 | 3(±r, ±r, ±r) | 0.000001223194501323058 |
| 2D-2 | 1 | 1 | (0, 0) | 0.233150669132352502286 |
| | 2 | 4 | (r, 0)$_{FS}$ | 0.107306091542219002412 |
| | 3 | 4 | (±r, ±r) | 0.057667859888794882030 |
| | 4 | 4 | (2r, 0)$_{FS}$ | 0.014208216158450750264 |
| | 5 | 8 | (2r, r)$_{FS}$ | 0.005353049000513775232 |
| | 6 | 4 | (±2r, ±2r) | 0.001011937592673575475 |
| | 7 | 4 | (3r, 0)$_{FS}$ | 0.000245301027757717345 |
| | 8 | 8 | (3r, r)$_{FS}$ | 0.000283414252994198217 |

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number. In the models given in the tables above, all the velocities are given in the units of the sound speed. The choices of the directions and the magnitudes of these velocities ensure accurate reproduction of macroscopic behavior by the lattice Boltzmann equation at high Knudsen number. The FS subscript means that the permutation with full symmetry should be taken. For example, (r, 0)_FS means the four velocities denoted by the vectors (r, 0), (−r, 0), (0, r), (0, −r) in two-dimensions.

As also illustrated in FIG. 1, the first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
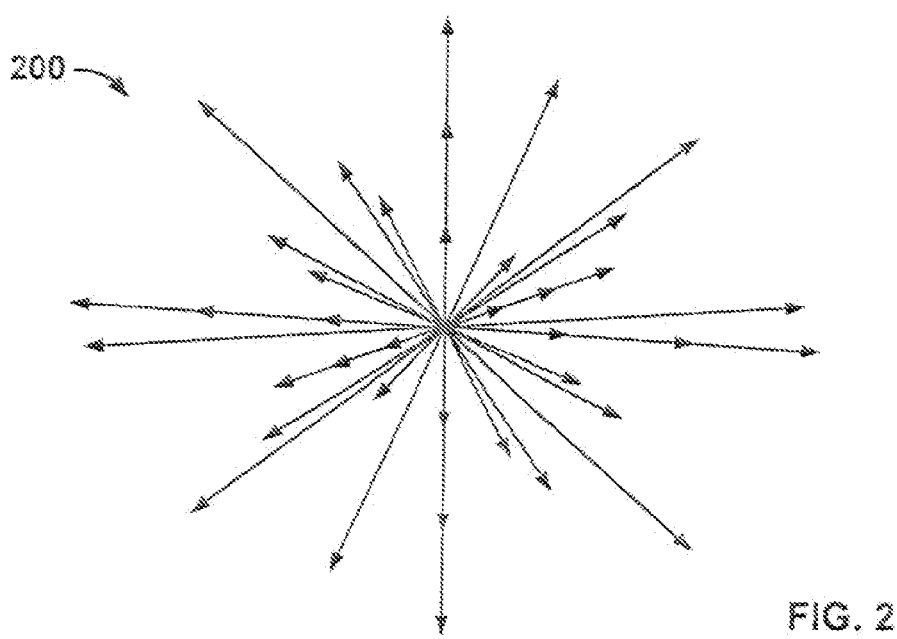

As also illustrated in FIG. 2, the second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

The third and fourth models (3D-2 and 2D-2) are more complex models, with 3D-2 included 101 velocities and 2D-2 including 37 velocities. The velocities are more clearly described by their component along each axis as documented in Tables 1 and 2 respectively.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of high-Knudsen number flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows with high Knudsen numbers can be simulated with high fidelity.

Figure 3:
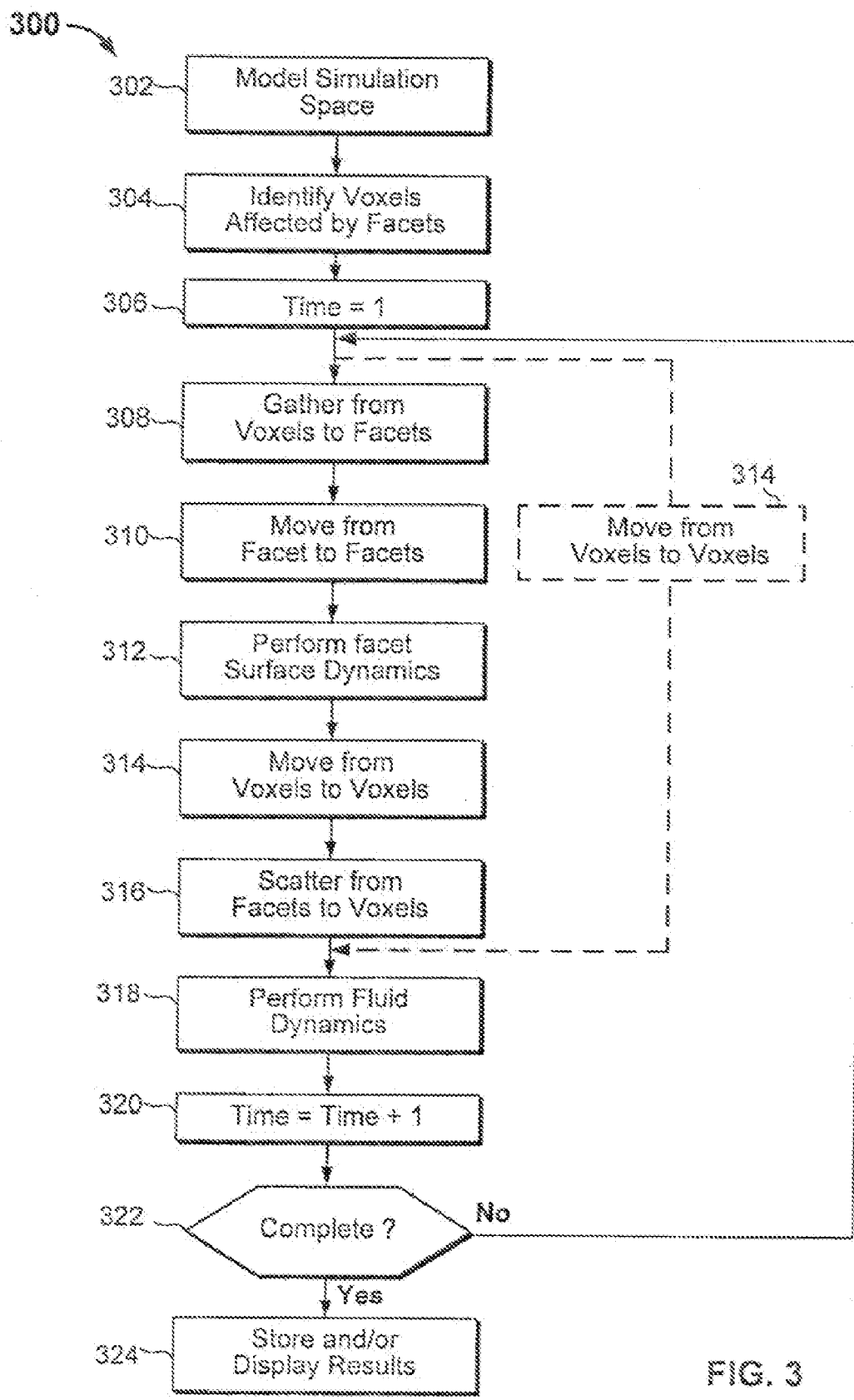
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v.$$ Eq. (5)

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{i,x}, c_{i,y}, c_{i,z}).$$ Eq. (6)

The energy level zero state represents stopped particles that are not moving in any dimension, i.e. $c_{stopped} = (0, 0, 0)$. Energy level one states represent particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states.).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
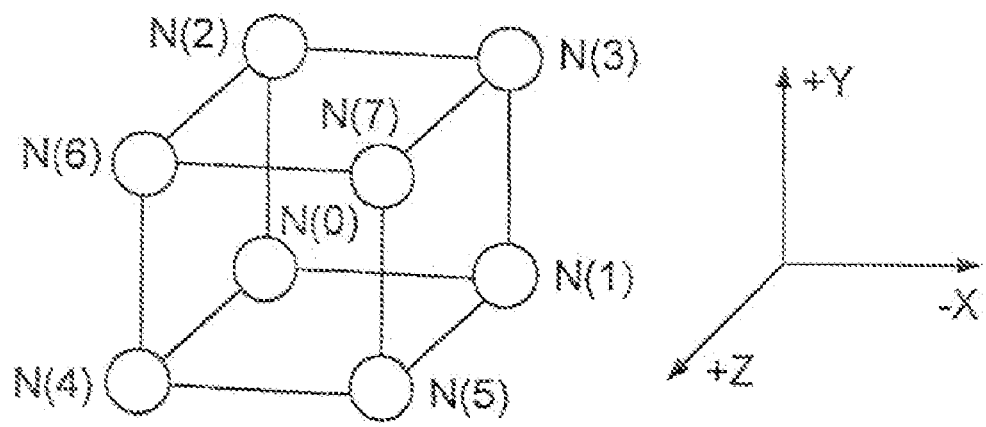
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and n∈{0, 1, 2, ..., 7}. A microblock is illustrated in FIG. 4.

Figure 5A:
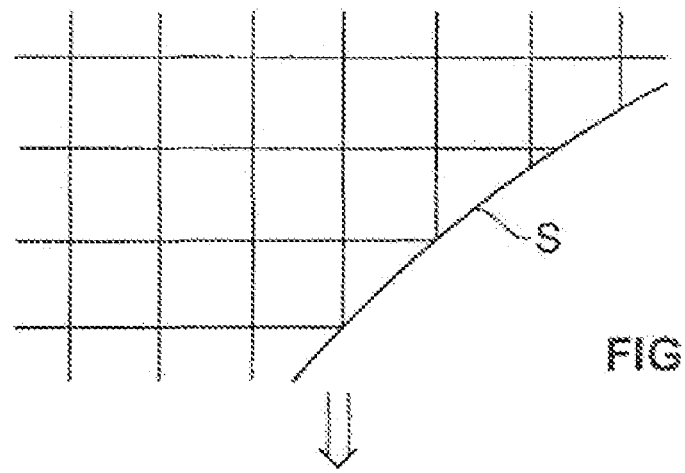
FIGS. 5A and 5B are illustrations of lattice structures used by the system of FIG. 3.
Figure 5B:
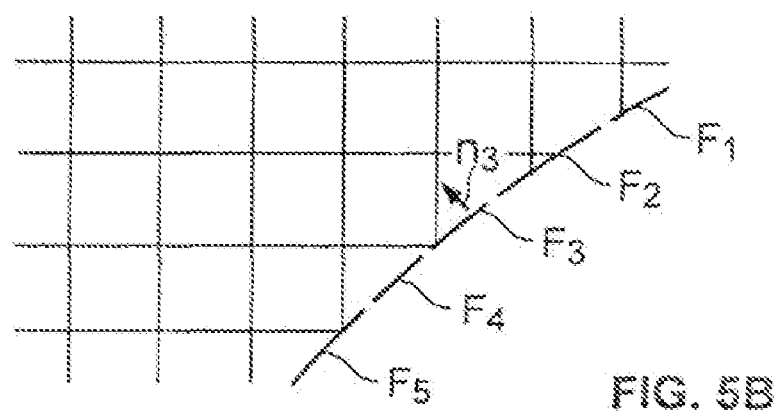

Referring to FIGS. 5A and 5B, a surface S (FIG. 3A) is represented in the simulation space (FIG. 5B) as a collection of facets $F_\alpha$:

$$S = \{F_\alpha\}$$ Eq. (7)

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
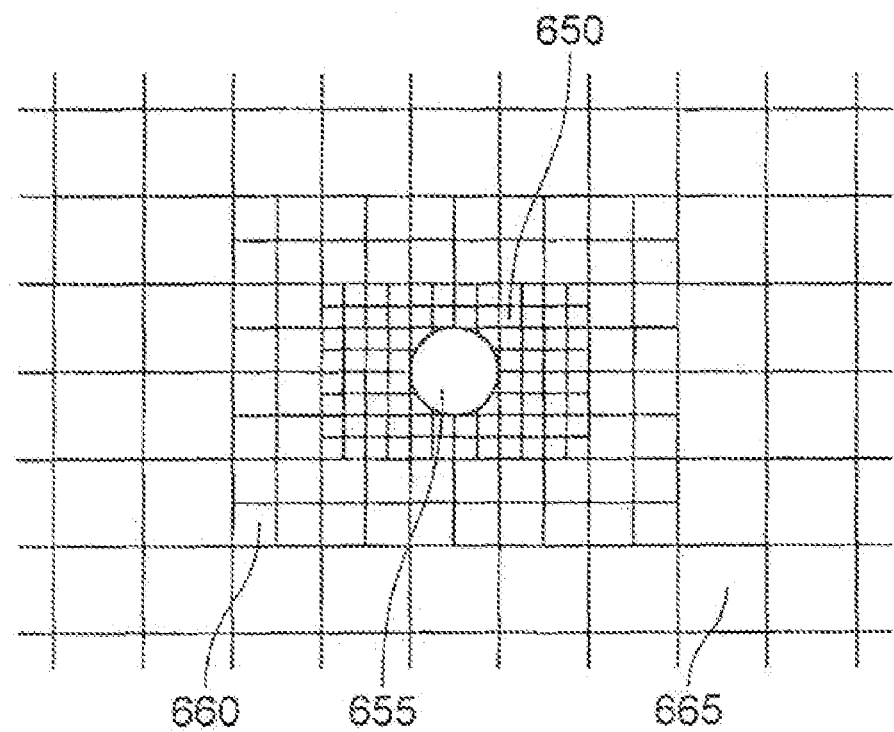
FIGS. 6 and 7 illustrate variable resolution techniques.
Figure 7:
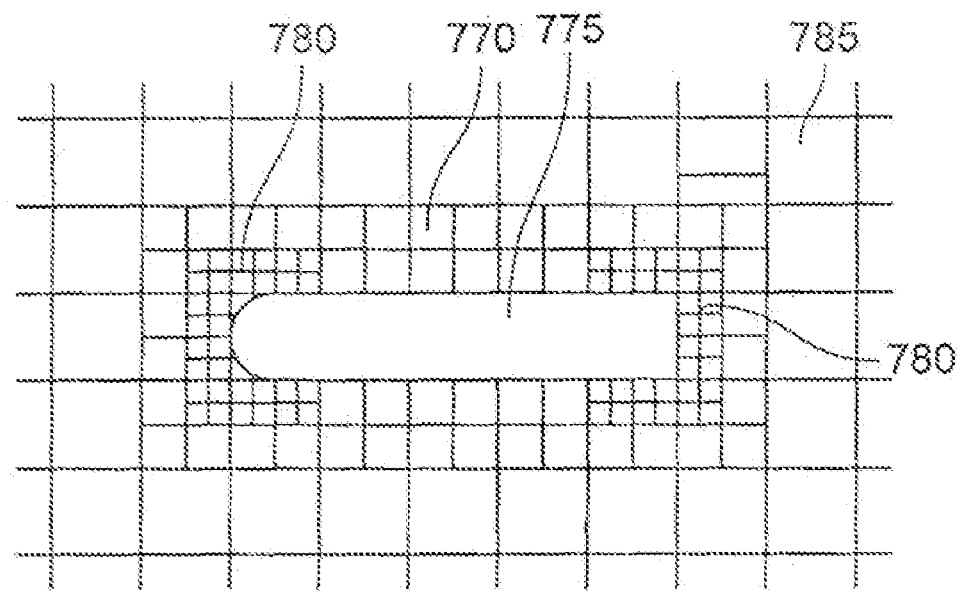

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

B. Identify Voxels Affected by Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
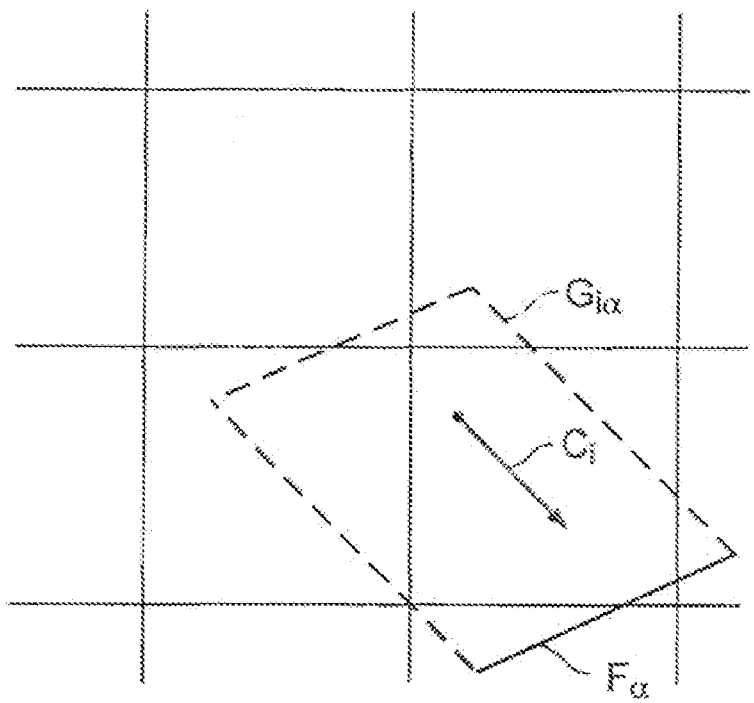
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha \qquad \text{Eq. (8)}$$

The facet $F_\alpha$ receives particles from the volume $V_{i\alpha}$ when the velocity vector of the state is directed toward the facet ($|c_i n_i| < 0$), and transfers particles to the region when the velocity vector of the state is directed away from the facet ($|c_i n_i| > 0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel $N(x)$ overlapped by a parallelepiped $G_{i\alpha}$ is defined as $V_{i\alpha}(x)$. Using this term, the flux $\Gamma_{i\alpha}(x)$ of state i particles that move between a voxel $N(x)$ and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x) = N_i(x) V_{i\alpha}(x). \qquad \text{Eq. (9)}$$

When the parallelepiped $G_{i\alpha}$ is intersected by one or more facets, the following condition is true:

$$V_{i\alpha} = \Sigma V_{i\alpha}(x)(x) + \Sigma V_{i\alpha}(\beta)(f_i) \qquad \text{Eq. (10)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha} = \Sigma V_{i\alpha}(x). \qquad \text{Eq. (11)}$$

C. Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel $N(x)$ and a facet $F_\alpha$ is:

$$\Gamma_{i\alpha}(x) = N_i(x) V_{i\alpha}(x). \qquad \text{Eq. (12)}$$

From this, for each state i directed toward a facet $F_\alpha$ ($c_i n_\alpha < 0$), the number of particles provided to the facet $F_\alpha$ by the voxels is:

$$\Gamma_{i\alpha V \to F} = \sum_X \Gamma_{i\alpha}(x) = \sum_X N_i(x) V_{i\alpha}(x) \qquad \text{Eq. (13)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 10:
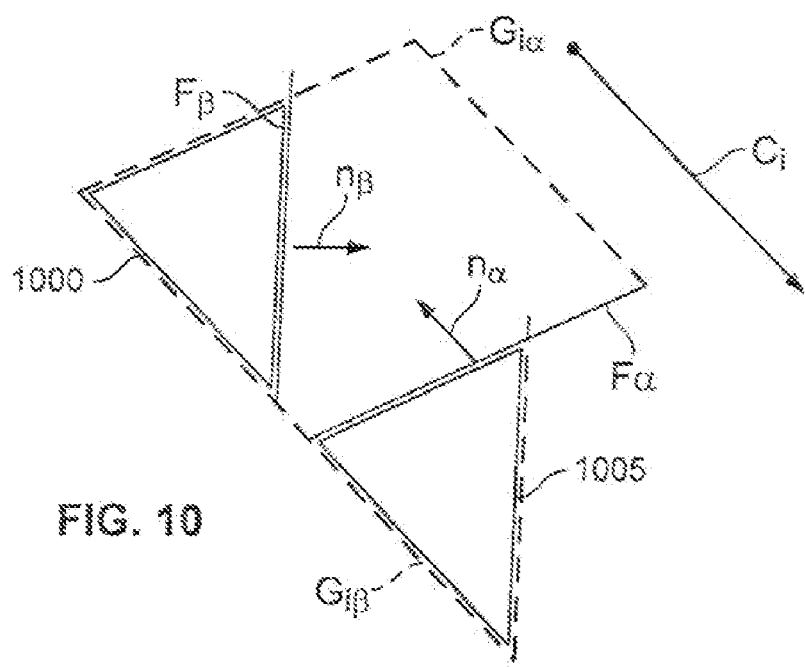
FIG. 10 illustrates movement of particles from a surface to a surface.

Next, particles are moved between facets (step 310). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta)/V_{i\alpha}, \qquad \text{Eq. (14)}$$

where $\sigma_i(\beta, t-1)$ is a measure of the state i particles produced by the facet $F_\beta$ during the previous time increment. From this, for each state i directed toward a facet $F_\alpha$ ($c_i n_\alpha < 0$), the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta, t-1) V_{i\alpha}(\beta)/V_{i\alpha} \qquad \text{Eq. (15)}$$

and the total flux of state i particles into the facet is:

$$\Gamma_{iIN}(\alpha) = \qquad \text{Eq. (16)}$$
$$\Gamma_{i\alpha V \to F} + \Gamma_{i\alpha F \to F} = \sum_X N_i(x) V_{i\alpha}(x) + \sum_\beta \Gamma_i(\beta, t-1) V_{i\alpha}(\beta)/V_{i\alpha}$$

The state vector $N(\alpha)$ for the facet, also referred to as a facet distribution function, has 54 entries corresponding to the 54 entries of the voxel state vectors. The input states of the facet distribution function $N(\alpha)$ are set equal to the flux of particles into those states divided by the volume $V_{i\alpha}$:

$$N_i(\alpha) = \Gamma_{iIN}(\alpha)/V_{i\alpha}, \qquad \text{Eq. (17)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha)/V \qquad \text{Eq. (18)}$$

for $c_i n_\alpha > 0$, wherein $\delta_{iOTHER}(\alpha)$ is determined using the technique described above for generating $\Gamma_{iIN}(\alpha)$, but applying the technique to states ($c_i n_\alpha > 0$) other than incoming states ($c_i n_\alpha < 0$)). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \qquad \text{Eq. (19)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
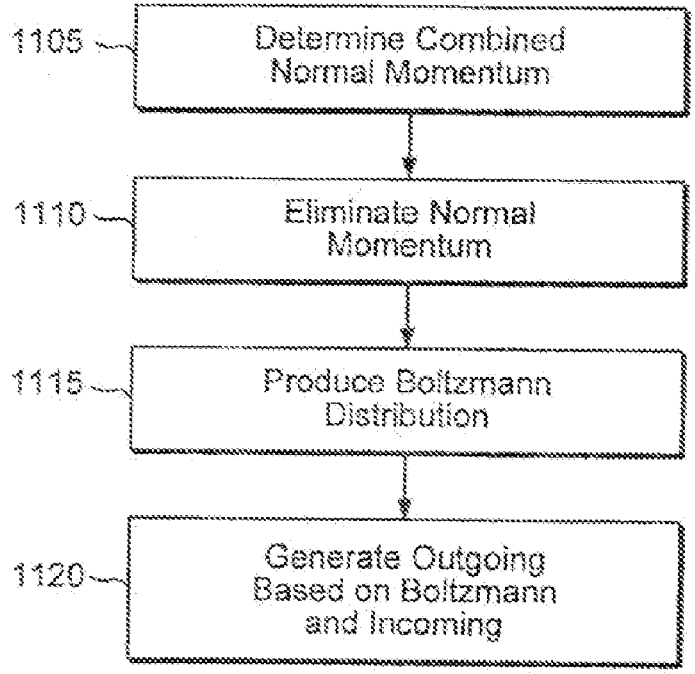
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum $P(\alpha)$ of the particles at the facet as:

$$P(\alpha) = \sum_i c_i * N_i^\alpha \qquad \text{Eq. (20)}$$

for all i. From this, the normal momentum $P_n(\alpha)$ is determined as:

$$P_n(\alpha) = n_\alpha \cdot P(\alpha). \qquad \text{Eq. (21)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta \Gamma_i(\alpha) = \Gamma_{iIN}(\alpha) - N_{n-\beta i}(\alpha) V_{i\alpha}. \qquad \text{Eq. (22)}$$

Using this difference, the outgoing flux distribution is:

$$\delta_{iOUT}(\alpha) = N_{n-\beta i}(\alpha) V_{i\alpha} - \Delta \Gamma_{i*}(\alpha), \qquad \text{Eq (23)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = N_{n-Bi}(\alpha) V_{i\alpha} \Delta \Gamma_{i*}(\alpha) + C_f(n_\alpha \cdot c_i)[N_{n-Bi*}(\alpha) - N_{n-Bi}(\alpha)] V_{i\alpha} + (n_\alpha \cdot c_i)(t_{2\alpha} \cdot c_i) \Delta N_{j,2} V_{i\alpha} + (n_\alpha \cdot c_i) (t_{2\alpha} \cdot c_i) \Delta N_{j,2} V_{i\alpha} \qquad \text{Eq. (24)}$$

for $n_\alpha c_i > 0$, where $C_f$ is a function of skin friction, $t_{i\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according $$\Delta N_{j,i,2} = -\frac{1}{2^2_j}\left(n_\alpha \cdot \sum_i c_i c_i N_{n-\beta i}(\alpha) \cdot t_{1,2\alpha}\right) \quad \text{Eq. (25)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha)n_\alpha)/\rho, \quad \text{Eq. (26)}$$

where $\rho$ is the density of the facet distribution:

$$\rho = \sum_i N_i(\alpha) \quad \text{Eq. (27)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha)V_{i\alpha}. \quad \text{Eq. (28)}$$

The outgoing flux distribution then becomes:

$$\Gamma_{iOUT}(\alpha) = N_{n-\beta i}(\alpha)V_{i\alpha} - \Delta\Gamma_{i^*}(\alpha) + C_f(n_\alpha c_i)[N_{n-\beta i^*}(\alpha) - N_{n-\beta i}(\alpha)]V_{i\alpha}, \quad \text{Eq. (29)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = p_\alpha n_\alpha A_\alpha - C_f p_\alpha u_\alpha A_\alpha \quad \text{Eq. (30)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha m j} = \sum_{i,c_{ij} \cdot n_\alpha < 0} \Gamma_{\alpha j i IN} - \sum_{i,c_{ji} \cdot n_\alpha > 0} \Gamma_{\alpha i j OUT} \quad \text{Eq. (31)}$$

where the index j denotes the energy of the state i. This energy difference is then used to $$\delta\Gamma_{\alpha j i} = V_{i\alpha}\Delta\Gamma_{\alpha m j} \Big/ \sum_{i,c_{ji} \cdot n_\alpha < 0} V_{i\alpha} \quad \text{Eq. (32)}$$

generate a difference term:
for $c_{ji}n_\alpha > 0$. This difference term is used to modify the outgoing flux so that the flux becomes:

$$\Gamma_{\alpha j i OUT f} = \Gamma_{\alpha j i OUT} + \delta\Gamma_{\alpha j i} \quad \text{Eq. (33)}$$

for $c_{ji}n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1, 0, 0). Interactions within the voxel will likely change the particle count for that state based on local interactions with other particles and surfaces. If not, the particle will continue to move along the lattice at the same speed and direction.

Figure 9:
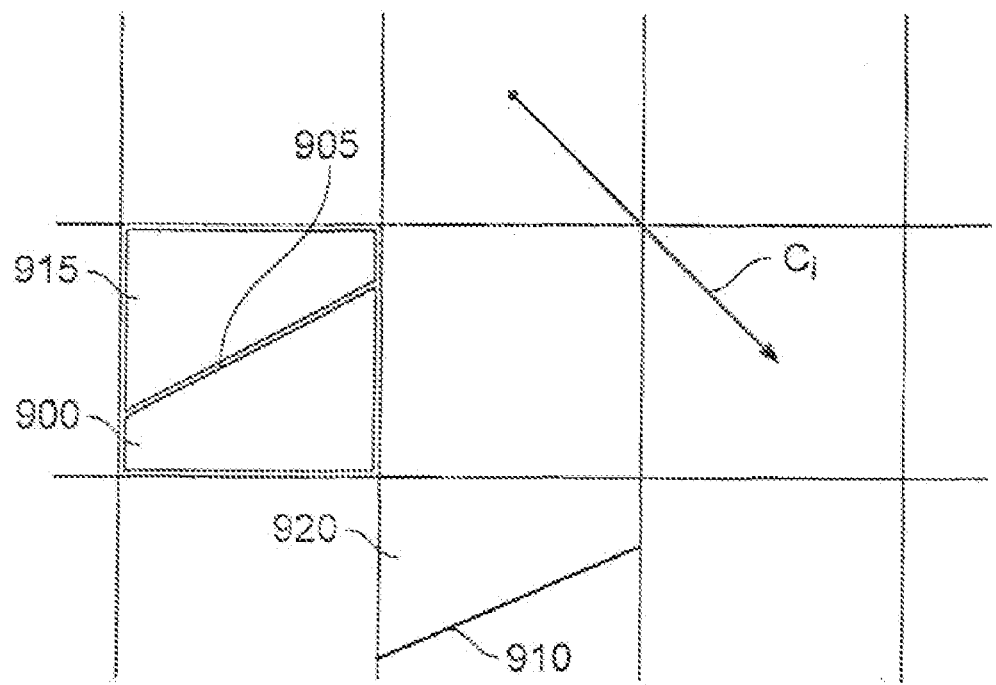
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equalled 25 and $V_{i\alpha}(x)$ equalled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \quad \text{Eq. (34)}$$

where N(x) is the source voxel.

6. Scatter from Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha iF \to V} = \frac{1}{P_f(x)} V_{\alpha i}(x) \Gamma_{\alpha iOUT_f} / V_{\alpha i} \quad \text{Eq. (35)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha iOUT_f} / V_{\alpha i} \quad \text{Eq. (36)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

D. Variable Resolution

Figure 12:
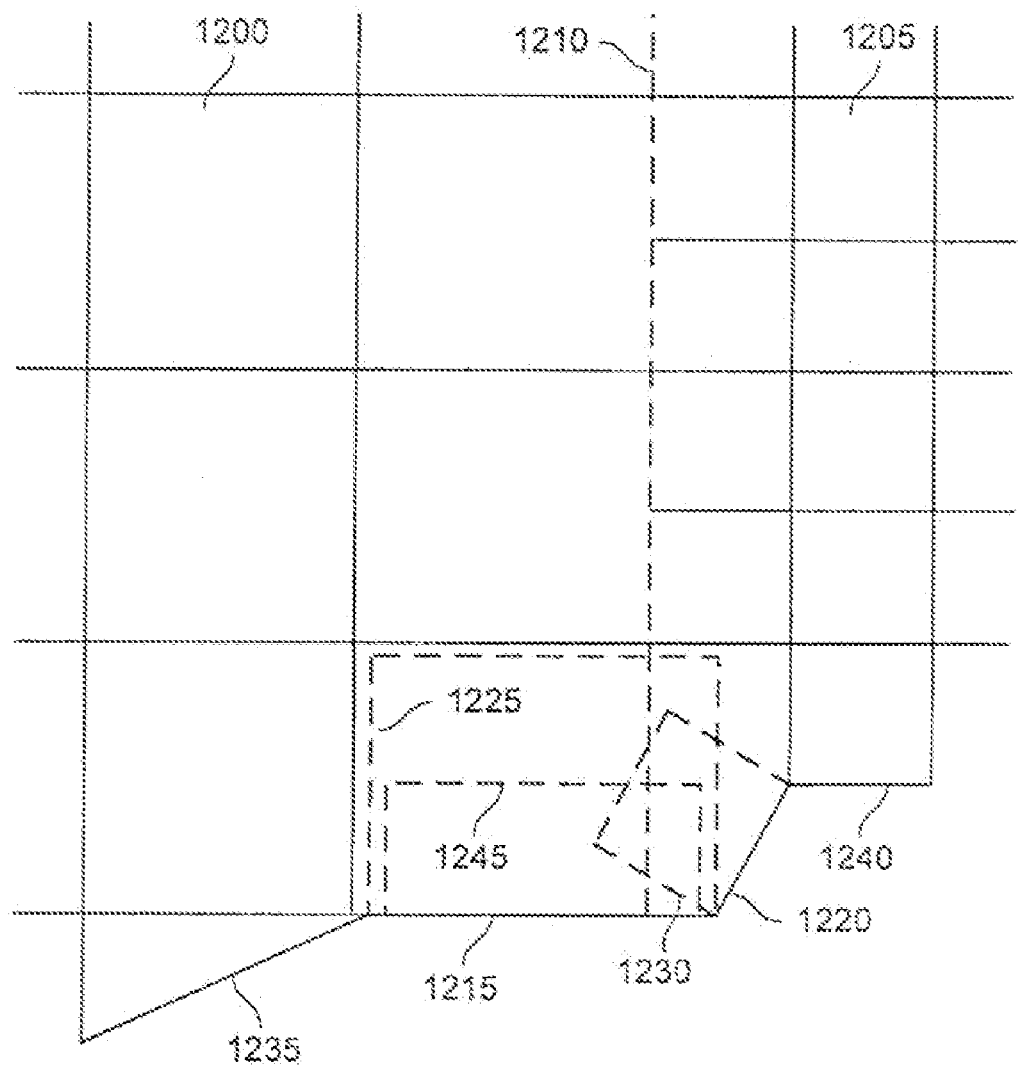
FIG. 12 illustrates an interface between voxels of different sizes.

Referring to FIG. 12, variable resolution (as illustrated in FIGS. 6 and 7 and discussed above) employs voxels of different sizes, hereinafter referred to as coarse voxels 12000 and fine voxels 1205. (The following discussion refers to voxels having two different sizes; it should be appreciated that the techniques described may be applied to three or more different sizes of voxels to provide additional levels of resolution.) The interface between regions of coarse and fine voxels is referred to as a variable resolution (VR) interface 1210.

When variable resolution is employed at or near a surface, facets may interact with voxels on both sides of the VR interface. These facets are classified as VR interface facets 1215 ($F_{\alpha IC}$) or VR fine facets 1220 ($F_{\alpha IF}$). A VR interface facet 1215 is a facet positioned on the coarse side of the VR interface and having a coarse parallelepiped 1225 extending into a fine voxel. (A coarse parallelepiped is one for which $c_i$ is dimensioned according to the dimensions of a coarse voxel, while a fine parallelepiped is one for which $c_i$ is dimensioned according to the dimensions of a fine voxel.) A VR fine facet 1220 is a facet positioned on the fine side of the VR interface and having a fine parallelepiped 1230 extending into a coarse voxel. Processing related to interface facets may also involve interactions with coarse facets 1235 ($F_{\alpha c}$) and fine facets 1240 ($F_{\alpha F}$).

For both types of VR facets, surface dynamics are performed at the fine scale, and operate as described above. However, VR facets differ from other facets with respect to the way in which particles advect to and from the VR facets.

Figure 13:
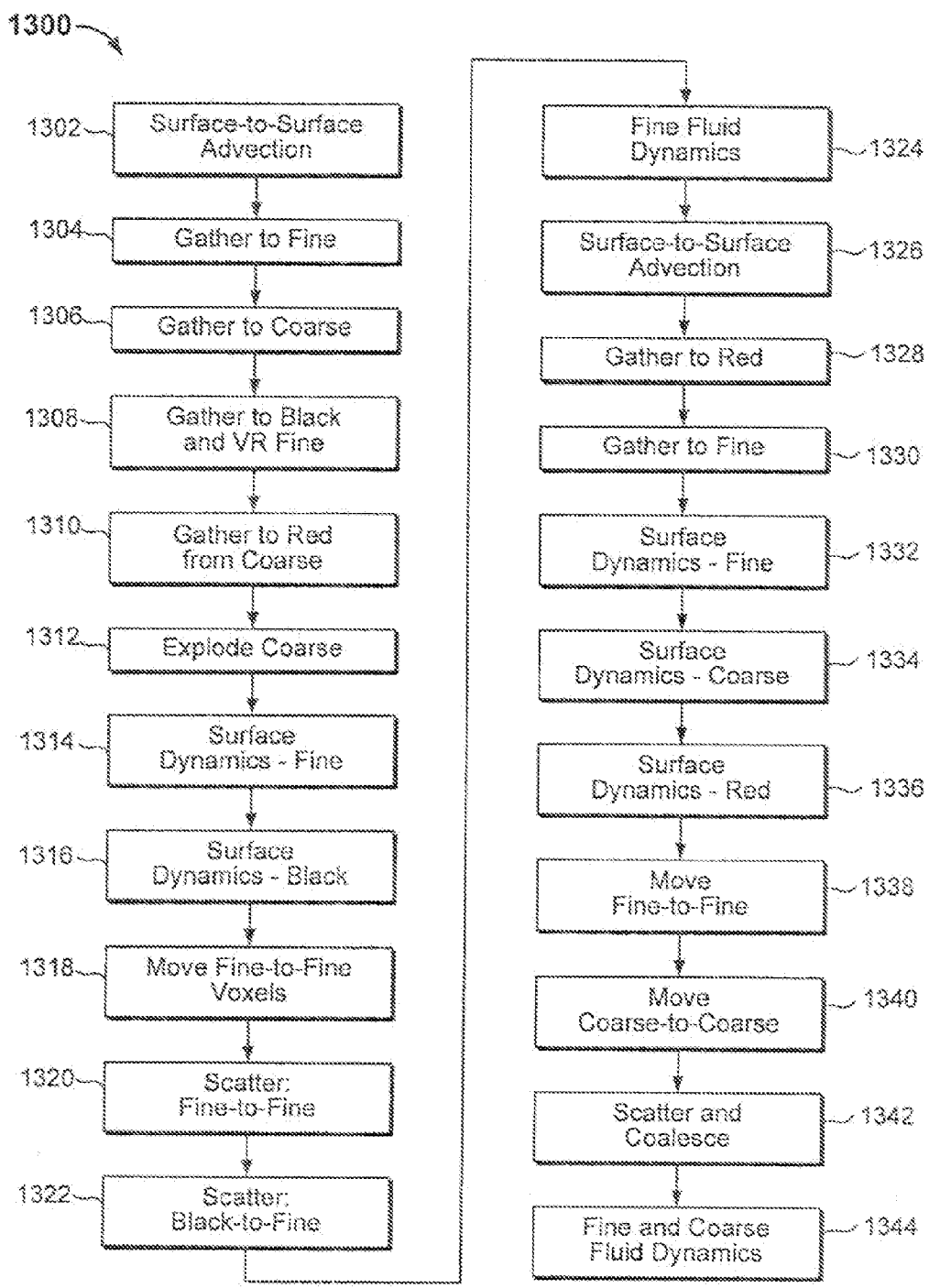
FIG. 13 is a flow chart of a procedure for simulating interactions with facets under variable resolution conditions.

Interactions with VR facets are handled using a variable resolution procedure 1300 illustrated in FIG. 13. Most steps of this procedure are carried out using the comparable steps discussed above for interactions with non-VR facets. The procedure 1300 is performed during a coarse time step (i.e., a time period corresponding to a coarse voxel) that includes two phases that each correspond to a fine time step. The facet surface dynamics are performed during each fine time step. For this reason, a VR interface facet $F_{\alpha IC}$ is considered as two identically sized and oriented fine facets that are referred to, respectively, as a black facet $F_{\alpha ICb}$ and a red facet $F_{\alpha ICr}$. The black facet $F_{\alpha ICb}$ is associated with the first fine time step within a coarse time step while the red facet $F_{\alpha ICr}$ is associated with the second fine time step within a coarse time step.

Initially, particles are moved (advected) between facets by a first surface-to-surface advection stage (step 1302). Particles are moved from black facets $F_{\alpha ICb}$ to coarse facets $F_{\beta C}$ with a weighting factor of $V_{-\alpha\beta}$ that corresponds to the volume of the unblocked portion of the coarse parallelepiped (FIG. 12, 1225) that extends from a facet $F_\alpha$ and that lies behind a facet $F_\beta$ less the unblocked portion of the fine parallelepiped (FIG. 12, 1245) that extends from the facet $F_\alpha$ and that lies behind the facet $F_\beta$. The magnitude of $c_i$ for a fine voxel is one half the magnitude of $c_i$ for a coarse voxel. As discussed above, the volume of a parallelepiped for a facet $F_\alpha$ is defined as:

$$V_{i\alpha} = |c_i n_\alpha| A_\alpha, \quad \text{Eq. (37)}$$

Accordingly, because the surface area $A_\alpha$ of a facet does not change between coarse and fine parallelepipeds, and because the unit normal $n_\alpha$ always has a magnitude of one, the volume of a fine parallelepiped corresponding to a facet is one half the volume of the corresponding coarse parallelepiped for the facet.

Particles are moved from coarse facets $F_{\alpha C}$ to black facets $F_{\beta ICb}$ with a weighting factor of $V_{\alpha\beta}$ that corresponds to the volume of the unblocked portion of the fine parallelepiped that extends from a facet $F_\alpha$ and that lies behind a facet $F_\beta$.

Particles are moved from red facets $F_{\alpha JCr}$ to coarse facets $F_{\beta C}$ with a weighting factor of $V_{\alpha\beta}$ and from coarse facets $F_{\alpha C}$ to red facets $F_{\beta JCr}$ with a weighting factor of $V_{-\alpha\beta}$.

Particles are moved from red facets $F_{\alpha JCr}$ to black facets $F_{\beta ICb}$ with a weighting factor of $V_{\alpha\beta}$. In this stage, black-to-red advections do not occur. In addition, because the black and red facets represent consecutive time steps, black-to-black advections (or red-to-red advections) never occur. For similar reasons, particles in this stage are moved from red facets $F_{\alpha JCr}$ to fine facets $F_{\beta IF}$ or $F_{\beta F}$ with a weighting factor of $V_{\alpha\beta}$, and from fine facets $F_{\alpha IF}$ or $F_{\alpha F}$ to black facets $F_{\alpha ICb}$ with the same weighting factor.

Finally, particles are moved from fine facets $F_{\alpha IF}$ or $F_{\alpha F}$ to other fine facets $F_{\beta IF}$ or $F_{\beta F}$ with the same weighting factor, and from coarse facets $F_{\alpha C}$ to other coarse facets $F_C$ with a weighting factor of $V_{C\alpha\beta}$ that corresponds to the volume of the unblocked portion of the coarse parallelepiped that extends from a facet $F_\alpha$ and that lies behind a facet $F_\beta$.

After particles are advected between surfaces, particles are gathered from the voxels in a first gather stage (steps 1304-1310). Particles are gathered for fine facets $F_{\alpha F}$ from fine voxels using fine parallelepipeds (step 1304), and for coarse facets $F_{\alpha C}$ from coarse voxels using coarse parallelepipeds (step 1306). Particles are then gathered for black facets $F_{\alpha JRb}$ and for VR fine facets $F_{\alpha JF}$ from both coarse and fine voxels using fine parallelepipeds (step 1308). Finally, particles are gathered for red facets $F_{\alpha JRr}$ from coarse voxels using the differences between coarse parallelepipeds and fine paralllel-epipeds (step 1310).

Next, coarse voxels that interact with fine voxels or VR facets are exploded into a collection of fine voxels (step 1312). The states of a coarse voxel that will transmit particles to a fine voxel within a single coarse time step are exploded. For example, the appropriate states of a coarse voxel that is not intersected by a facet are exploded into eight fine voxels oriented like the microblock of FIG. 4. The appropriate states of coarse voxel that is intersected by one or more facets are exploded into a collection of complete and/or partial fine voxels corresponding to the portion of the coarse voxel that is not intersected by any facets. The particle densities $N_i(x)$ for a coarse voxel and the fine voxels resulting from the explosion thereof are equal, but the fine voxels may have fractional factors $P_f$ that differ from the fractional factor of the coarse voxel and from the fractional factors of the other fine voxels.

Thereafter, surface dynamics are performed for the fine facets $F_{\alpha IF}$ and $F_{\alpha F}$ (step 1314), and for the black facets $F_{\alpha ICb}$ (step 1316). Dynamics are performed using the procedure illustrated in FIG. 11 and discussed above.

Next, particles are moved between fine voxels (step 1318) including actual fine voxels and fine voxels resulting from the explosion of coarse voxels. Once the particles have been moved, particles are scattered from the fine facets $F_{\alpha IF}$ and $F_{\alpha F}$ to the fine voxels (step 1320).

Particles are also scattered from the black facets $F_{\alpha ICb}$ to the fine voxels (including the fine voxels that result from exploding a coarse voxel) (step 1322). Particles are scattered to a fine voxel if the voxel would have received particles at that time absent the presence of a surface. In particular, particles are scattered to a voxel $N(x)$ when the voxel is an actual fine voxel (as opposed to a fine voxel resulting from the explosion of a coarse voxel), when a voxel $N(x+c_i)$ that is one velocity unit beyond the voxel $N(x)$ is an actual fine voxel, or when the voxel $N(x+c_i)$ that is one velocity unit beyond the voxel $N(x)$ is a fine voxel resulting from the explosion of a coarse voxel.

Finally, the first fine time step is completed by performing fluid dynamics on the fine voxels (step 1324). The voxels for which fluid dynamics are performed do not include the fine voxels that result from exploding a coarse voxel (step 1312).

The procedure 1300 implements similar steps during the second fine time step. Initially, particles are moved between surfaces in a second surface-to-surface advection stage (step 1326). Particles are advected from black facets to red facets, from black facets to fine facets, from fine facets to red facets, and from fine facets to fine facets.

After particles are advected between surfaces, particles are gathered from the voxels in a second gather stage (steps 1328-1330). Particles are gathered for red facets $F_{\alpha JRr}$ from fine voxels using fine parallelepipeds (step 1328). Particles also are gathered for fine facets $F_{\alpha F}$ and $F_{\alpha IF}$ from fine voxels using fine parallelepipeds (step 1330).

Thereafter, surface dynamics are performed for the fine facets $F_{\alpha IF}$ and $F_{\alpha F}$ (step 1332), for the coarse facets $F_{\alpha C}$ (step 1134), and for the red facets $F_{\alpha JCr}$ (step 1336) as discussed above.

Next, particles are moved between voxels using fine resolution (step 1338) so that particles are moved to and from fine voxels and fine voxels representative of coarse voxels. Particles are then moved between voxels using coarse resolution (step 1340) so that particles are moved to and from coarse voxels.

Next, in a combined step, particles are scattered from the facets to the voxels while the fine voxels that represent coarse voxels (i.e., the fine voxels resulting from exploding coarse voxels) are coalesced into coarse voxels (step 1342). In this combined step, particles are scattered from coarse facets to coarse voxels using coarse parallelepipeds, from fine facets to fine voxels using fine parallelepipeds, from red facets to fine or coarse voxels using fine parallelepipeds, and from black facets to coarse voxels using the differences between coarse parallelepipeds and find parallelepipeds. Finally, fluid dynamics are performed for the fine voxels and the coarse voxels (step 1344).

A number of implementations have been described. Nevertheless, it will be understood that various modifications may be made without departing from the spirit and scope of the claims. Accordingly, other implementations are within the scope of the following claims.

What is claimed is:

1. A computer program product tangibly embodied in a non-transitory computer readable medium, the computer program product including instructions that, when executed, simulate a physical process, the computer program product configured to cause a computer to:

store, in a computer-accessible memory, state vectors for voxels, the state vectors corresponding to a model and comprising a plurality of entries that correspond to particular momentum states of possible momentum states at a voxel;

perform interaction operations on the state vectors, the interaction operations modeling interactions between elements of different momentum states according to the model; and perform move operations on the state vectors to reflect movement of elements to new voxels according to the model, wherein the model simulates a high-Knudsen number flow that has a Knudsen number greater than 0.1.

2. The computer program product of claim 1 further configured to cause a computer to store a representation of at least one surface in the memory.

3. The computer program product of claim 1 further configured to cause a computer to perform surface interaction operations which model interactions between the surface and elements of at least one voxel near the surface, wherein:
(a) the elements have a tangential momentum relative to the surface,
(b) the surface interaction operations retain at least a portion of the tangential momentum of the elements,
(c) the portion of tangential momentum retained corresponds to a friction parameter, and
(d) the friction parameter is varied based on changes in pressure near the surface.

4. The computer program product of claim 1 wherein the model represents particles at a particular voxel as corresponding to different states, with each state representing a number of particles having a particular velocity vector.

5. The computer program product of claim 4 wherein:
the model associates a weight with each state, and
causing the computer to perform interaction operations comprises causing the computer to perform interaction operations on state vectors using weights associated with states to which the state vectors correspond.

6. The computer program product of claim 4 wherein the model includes a first state group representing a number of particles having zero velocity.

7. The computer program product of claim 6 wherein the model includes a second state group including states associated with particles moving at a unit velocity.

8. The computer program product of claim 7 wherein the second state group includes states corresponding to particles moving in different directions relative to lattice axes.

9. The computer program product of claim 7 wherein the model includes a third state group including states associated with particles moving at twice the unit velocity.

10. The computer program product of claim 9 wherein the model includes a fourth state group including states associated with particles moving at three times the unit velocity.

11. The computer program product of claim 10 wherein:
the second state group includes a first sub-group including states corresponding to particle movement at the unit velocity along a single lattice axis;
the third state group includes a second sub-group including states corresponding to particle movement at twice the unit velocity along a single lattice axis and a third sub-group including states corresponding to particle movement at the unit velocity along two lattice axes, and
the fourth state group includes a fourth sub-group including states corresponding to particle movement at three times the unit velocity along a single lattice axis.

12. The computer program product of claim 11 wherein:
the fourth state group includes a fifth sub-group including states corresponding to particle movement at the unit velocity along one of the lattice axes and particle movement at twice the unit velocity along the other of the lattice axes;
the model includes a fifth state group including states associated with particles moving at four times the unit velocity, and
the fifth state group includes a sixth sub-group including states corresponding to particle movement at twice the unit velocity along two lattice axes and a seventh sub-group including states corresponding to particle movement at the unit velocity along one of the lattice axes and particle movement at three times the unit velocity along the other of the lattice axes.

13. The computer program product of claim 12 wherein:
the second state group includes a first sub-group including states corresponding to particle movement at the unit velocity along a single lattice axis;
the third state group includes a second sub-group including states corresponding to particle movement at twice the unit velocity along a single lattice axis,
the fourth state group includes a third sub-group including states corresponding to particle movement at three times the unit velocity along a single lattice axis and a fourth sub-group including states corresponding to particle movement at the unit velocity along all of the lattice axes,
the model includes a fifth state group including states associated with particles moving at four times the unit velocity, and
the fifth state group includes a fifth sub-group including states corresponding to particle movement at twice the unit velocity along two of the three lattice axes.

14. The computer program product of claim 13 wherein:
the fourth state group includes a sixth sub-group including states corresponding to particle movement at three times the unit velocity along two of the three lattice axes and no particle movement along the other lattice axis,
the model includes a sixth state group including states associated with particles moving at six times the unit velocity,
the sixth state group includes a seventh sub-group including states corresponding to particle movement at three times the unit velocity along all of the three lattice axes,
the model includes a seventh state group including states associated with particles moving at five times the unit velocity, and
the seventh state group includes an eighth sub-group including states corresponding to particle movement at the unit velocity along two of the three lattice axes and a ninth sub-group corresponding to particle movement at three times the unit velocity relative to the other lattice axis.

15. A computer-implemented method for simulating a physical process, the method comprising:
storing, in a computer-accessible memory, state vectors for voxels, the state vectors corresponding to a model and comprising a plurality of entries that correspond to particular momentum states of possible momentum states at a voxel;
performing interaction operations on the state vectors, the interaction operations modeling interactions between elements of different momentum states according to the model; and
performing move operations on the state vectors to reflect movement of elements to new voxels according to the model,
wherein the model simulates a high-Knudsen number flow that has a Knudsen number greater than 0.1.

16. The method of claim 15 further comprising storing a representation of at least one surface in the memory.

17. The method of claim 15 further comprising performing surface interaction operations which model interactions between the surface and elements of at least one voxel near the surface, wherein:

(a) the elements have a tangential momentum relative to the surface, (b) the surface interaction operations retain at least a portion of the tangential momentum of the elements, (c) the portion of tangential momentum retained corresponds to a friction parameter, and (d) the friction parameter is varied based on changes in pressure near the surface.

18. The method of claim 15 wherein the model represents particles at a particular voxel as corresponding to different states, with each state representing a number of particles having a particular velocity vector.

19. The method of claim 18 wherein:

the model associates a weight with each state, and performing interaction operations comprises performing interaction operations on state vectors using weights associated with states to which the state vectors correspond.

20. The method of claim 18 wherein the model includes a first state group representing a number of particles having zero velocity.

21. The method of claim 20 wherein the model includes a second state group including states associated with particles moving at a unit velocity.

22. The method of claim 21 wherein the second state group includes states corresponding to particles moving in different directions relative to lattice axes.

23. The method of claim 21 wherein the model includes a third state group including states associated with particles moving at twice the unit velocity.

24. The method of claim 23 wherein the model includes a fourth state group including states associated with particles moving at three times the unit velocity.

25. The method of claim 24 wherein:

the second state group includes a first sub-group including states corresponding to particle movement at the unit velocity along a single lattice axis;

the third state group includes a second sub-group including states corresponding to particle movement at twice the unit velocity along a single lattice axis and a third sub-group including states corresponding to particle movement at the unit velocity along two lattice axes, and the fourth state group includes a fourth sub-group including states corresponding to particle movement at three times the unit velocity along a single lattice axis.

26. The method of claim 25 wherein:

the fourth state group includes a fifth sub-group including states corresponding to particle movement at the unit velocity along one of the lattice axes and particle movement at twice the unit velocity along the other of the lattice axes;

the model includes a fifth state group including states associated with particles moving at four times the unit velocity, and the fifth state group includes a sixth sub-group including states corresponding to particle movement at twice the unit velocity along two lattice axes and a seventh sub-group including states corresponding to particle movement at the unit velocity along one of the lattice axes and particle movement at three times the unit velocity along the other of the lattice axes.

27. The method of claim 26 wherein:

the second state group includes a first sub-group including states corresponding to particle movement at the unit velocity along a single lattice axis;

the third state group includes a second sub-group including states corresponding to particle movement at twice the unit velocity along a single lattice axis, the fourth state group includes a third sub-group including states corresponding to particle movement at three times the unit velocity along a single lattice axis and a fourth sub-group including states corresponding to particle movement at the unit velocity along all of the lattice axes, the model includes a fifth state group including states associated with particles moving at four times the unit velocity, and the fifth state group includes a fifth sub-group including states corresponding to particle movement at twice the unit velocity along two of the three lattice axes.

28. The method of claim 27 wherein:

the fourth state group includes a sixth sub-group including states corresponding to particle movement at three times the unit velocity along two of the three lattice axes and no particle movement along the other lattice axis, the model includes a sixth state group including states associated with particles moving at six times the unit velocity, the sixth state group includes a seventh sub-group including states corresponding to particle movement at three times the unit velocity along all of the three lattice axes, the model includes a seventh state group including states associated with particles moving at five times the unit velocity, and the seventh state group includes an eighth sub-group including states corresponding to particle movement at the unit velocity along two of the three lattice axes and a ninth sub-group corresponding to particle movement at three times the unit velocity relative to the other lattice axis.

29. A computer system for simulating a physical process, the system being configured to:

store, in a computer-accessible memory, state vectors for voxels, the state vectors corresponding to a model and comprising a plurality of entries that correspond to particular momentum states of possible momentum states at a voxel;

perform interaction operations on the state vectors, the interaction operations modeling interactions between elements of different momentum states according to the model; and perform move operations on the state vectors to reflect movement of elements to new voxels according to the model, wherein the model simulates a high-Knudsen number flow that has a Knudsen number greater than 0.1.

30. The system of claim 29 further configured store a representation of at least one surface in the memory.

31. The system of claim 29 further configured to perform surface interaction operations which model interactions between the surface and elements of at least one voxel near the surface, wherein:

(a) the elements have a tangential momentum relative to the surface, (b) the surface interaction operations retain at least a portion of the tangential momentum of the elements, (c) the portion of tangential momentum retained corresponds to a friction parameter, and (d) the friction parameter is varied based on changes in pressure near the surface.

32. The system of claim 29 wherein the model represents particles at a particular voxel as corresponding to different states, with each state representing a number of particles having a particular velocity vector.

33. The system of claim 32 wherein:
the model associates a weight with each state, and
performing interaction operations comprises performing interaction operations on state vectors using weights associated with states to which the state vectors correspond.

34. The system of claim 32 wherein the model includes a first state group representing a number of particles having zero velocity.

35. The system of claim 34 wherein the model includes a second state group including states associated with particles moving at a unit velocity.

36. The system of claim 35 wherein the second state group includes states corresponding to particles moving in different directions relative to lattice axes.

37. The system of claim 36 wherein the model includes a third state group including states associated with particles moving at twice the unit velocity.

38. The system of claim 37 wherein the model includes a fourth state group including states associated with particles moving at three times the unit velocity.

39. The system of claim 38 wherein:
the second state group includes a first sub-group including states corresponding to particle movement at the unit velocity along a single lattice axis;
the third state group includes a second sub-group including states corresponding to particle movement at twice the unit velocity along a single lattice axis and a third sub-group including states corresponding to particle movement at the unit velocity along two lattice axes, and
the fourth state group includes a fourth sub-group including states corresponding to particle movement at three times the unit velocity along a single lattice axis.

40. The system of claim 39 wherein:
the fourth state group includes a fifth sub-group including states corresponding to particle movement at the unit velocity along one of the lattice axes and particle movement at twice the unit velocity along the other of the lattice axes;
the model includes a fifth state group including states associated with particles moving at four times the unit velocity, and
the fifth state group includes a sixth sub-group including states corresponding to particle movement at twice the unit velocity along two lattice axes and a seventh sub-group including states corresponding to particle movement at the unit velocity along one of the lattice axes and particle movement at three times the unit velocity along the other of the lattice axes.

\* \* \* \* \*